United States Patent [19]

Leutwyler

[11] Patent Number: 5,401,374
[45] Date of Patent: Mar. 28, 1995

[54] ELECTROLYZER FOR PLATING WASTE WATER

[75] Inventor: René Leutwyler, Maegenwil, Switzerland

[73] Assignee: JWI, Inc., Holland, Mich.

[21] Appl. No.: 237,602

[22] Filed: May 3, 1994

Related U.S. Application Data

[63] Continuation-in-part of Ser. No. 206,418, Mar. 4, 1994, abandoned.

[51] Int. Cl.⁶ .......................... C25B 9/00; C25B 15/08
[52] U.S. Cl. .......................... 204/272; 204/275
[58] Field of Search ............. 204/269, 272, 275, 149

[56] References Cited

U.S. PATENT DOCUMENTS 2,997,430  8/1961  Föyn .......................... 204/272 X
4,159,235  6/1979  Kammel et al. ............. 204/272
4,193,859  3/1980  King ........................... 204/272 X

*Primary Examiner*—Donald R. Valentine
*Attorney, Agent, or Firm*—Flynn, Thiel, Boutell & Tanis

[57] ABSTRACT

A plating waste water treating apparatus including a tank defining an interior treating chamber. A sleevelike electrode which functions as an anode is positioned concentrically within and spaced slightly from the tank wall. An electrode which functions as a cathode is concentrically positioned within and spaced from the anode, with the cathode being defined by two concentric but radially spaced coil springs, with the outer spring functioning to receive thereon the metal deposits. A diffuser plate is provided at one end of the treating chamber to control waste water flow into the treating chamber.

18 Claims, 2 Drawing Sheets

5,401,374

ELECTROLYZER FOR PLATING WASTE WATER

CROSS REFERENCE TO RELATED APPLICATION

This is a continuation-in-part of application Ser. No. 08/206,418, filed Mar. 4, 1994, now abandoned, and entitled ELECTROLYZER FOR PLATING WASTE WATER.

FIELD OF THE INVENTION

This invention relates to a simple and relatively inexpensive apparatus for removing metals from plating waste water.

BACKGROUND OF THE INVENTION

When plating articles with a plating solution containing metals, the plated articles are typically removed from the plating solution and dipped into one or more rinse water tanks to effect removal of excess plating material so as to improve the quality of the plated finish. The rinse water tanks gradually accumulate therein various plating metals such as zinc, nickel, silver, gold or tin, depending upon the plating material. The metals which collect in the rinse water tanks ultimately reach a concentration level which requires disposal of the rinse water, the latter commonly being referred to as waste water. The waste water is typically treated in an attempt to remove heavy metals since disposal of the waste water creates a pollution problem. For this reason, numerous processes and apparatus have been developed for treating the waste water, including arrangements which involve a plurality of large electrically charged plates which are contained in a waste water treating tank so as to effect electrolytic deposit of the metals on the plates, which plates are then removed and either cleaned for reuse or otherwise properly disposed of. Most known processes and apparatus for treating waste water, however, have been structurally complex and costly, and in many situations wholly unsuitable for use in smaller business operations where the cost and/or operational magnitude of the arrangement makes use of such apparatus uneconomical.

Accordingly, it is an object of this invention to provide an improved apparatus for treating plating waste water, particularly for removing metals from the waste water, which apparatus is structurally simple and economical, which operates in a highly desirable manner, and which is particularly suitable for use by small businesses.

More specifically, the improved waste water treating apparatus of this invention involves a tank which defines therein an interior treating chamber. A sleevelike electrode which functions as an anode is positioned concentrically within and spaced slightly from the tank wall. An electrode which functions as a cathode is concentrically positioned within and spaced from the anode, with the cathode being defined by two or more concentric but slightly spaced coil springs, with at least the outer spring functioning to receive thereon the metal deposits. In this improved apparatus, a diffuser plate is provided at one end of the treating chamber and associated with the waste water inlet so as to control flow into the treating chamber. The apparatus is preferably operated under a condition whereby the chamber is maintained under a low pressure, such as about one atmosphere pressure.

Other objects and purposes of the invention will be apparent to persons familiar with devices of this general type upon reading the following specification and inspecting the accompanying drawings.

Figure 1:
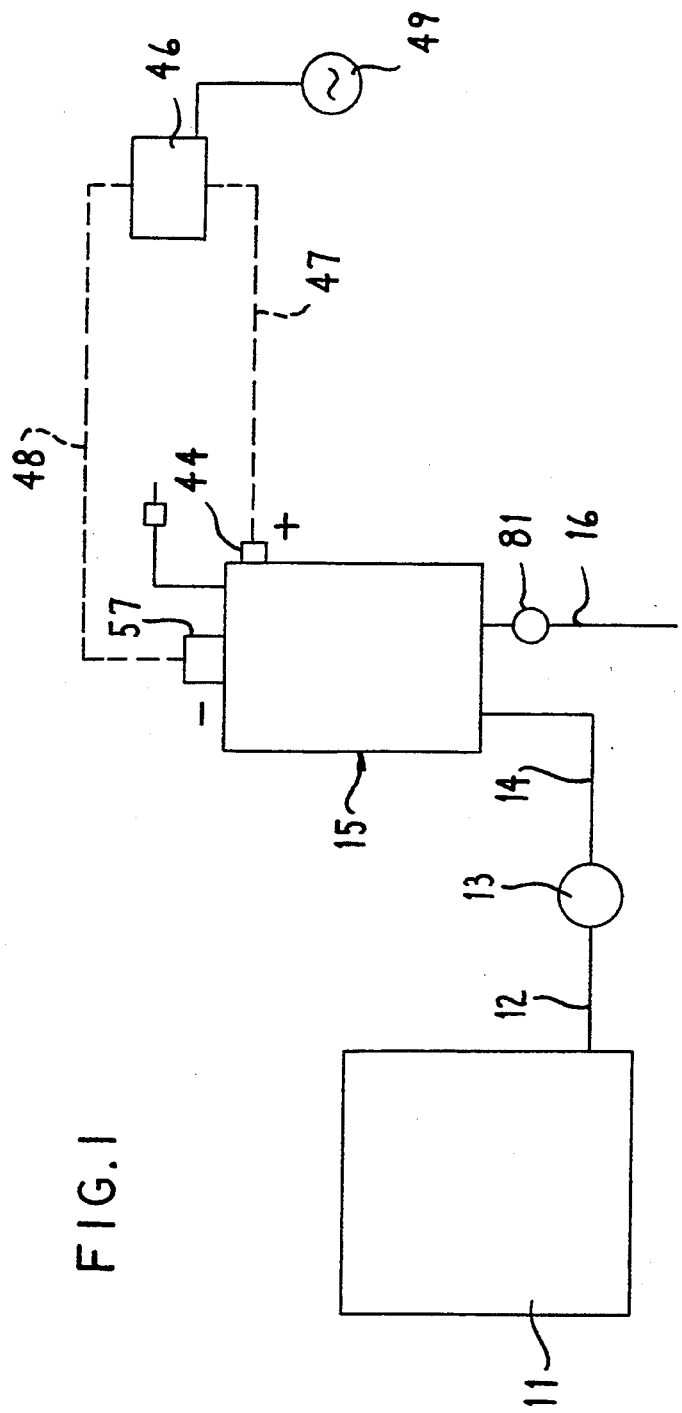
FIG. 1 is a diagrammatic illustration of an arrangement for treating plating waste water, which arrangement incorporates therein the improved electrolytic treating apparatus of this invention.

Certain terminology will be used in the following description for convenience in reference only, and will not be limiting For example, the words "upwardly" "downwardly" "rightwardly" and "leftwardly" will refer to directions in the drawings to which reference is made. The words "inwardly" and "outwardly" will refer to directions toward and away from, respectively, the geometric center of the apparatus and designated parts thereof. Said terminology will include the words specifically mentioned, derivatives thereof, and words of similar import.

DETAILED DESCRIPTION

Referencing FIG. 1, there is diagrammatically illustrated a plating rinse tank 11 which contains therein a rinsing liquid normally water. The plated articles, generally immediately following plating, are dipped into one or more such rinse tanks 11 to remove excess plating solution or material, thereby causing a buildup of plating metals in the rinse water.

To effect cleaning of the waste or rinse water from the rinse tank 11, the waste water can be supplied through lines 12 and 14 by a pump 13 to an electrolyzer 15 according to the present invention. This electrolyzer 15 is provided so as to permit removal of metals from the waste water, with the clarified waste water then being discharged from the electrolyzer through a discharge line 16, which water is then normally suitable for discharge into a waste treatment system. The electrolyzer 15 has positive and negative electrodes which are connected to suitable electrical conductors 47 and 48 which couple to a direct-current power source 46, such as a rectifier which connects to standard AC power 49.

Figure 2:
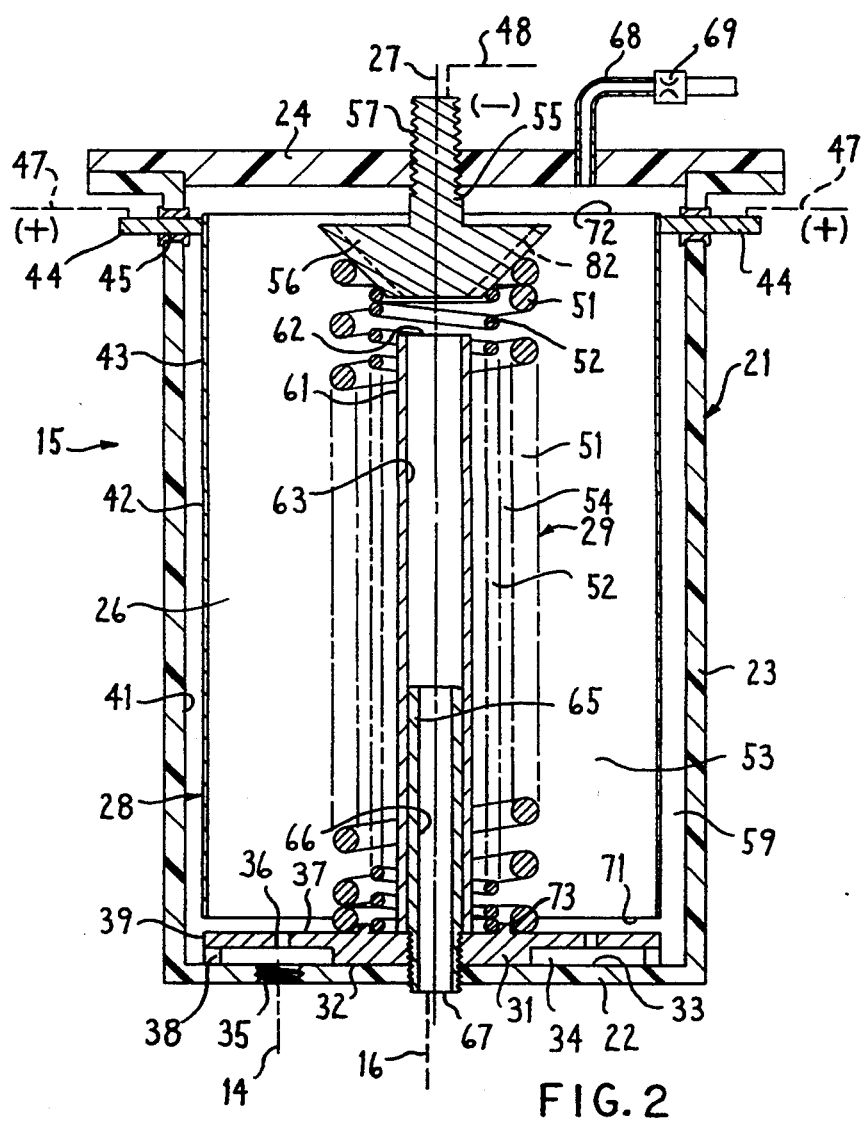
FIG. 2 is an enlarged central sectional view of the improved electrolytic treating apparatus of the present invention.

Referring now to FIG. 2, there is illustrated the construction of the improved electrolyzer 15 according to the present invention. This electrolyzer includes an enclosed housing 21 which has a base wall 22 joined to the lower end of an upstanding cylindrical tubular side wall 23, with a top wall or cover 24 being removably secured to the upper end of the side wall by suitable releasable fasteners (not shown) such as clamps or screws so as to define a closed treating chamber 26 within the housing. The housing is constructed of an electrically insulated material, preferably a plastic material such as polypropylene.

Positioned within the chamber 26, directly adjacent the base wall 22, is a diffuser member 31 which is also constructed of an electrically nonconductive material, preferably plastic such as polypropylene. The diffuser member 31 is formed generally as a flat circular plate having a bottom surface 32 which bears on the upper surface 33 of the base wall 22. The diffuser plate 31 has an annular recess 34 which is formed therein and opens upwardly from the bottom surface 32 thereof, which recess concentrically surrounds the central axis of the diffuser plate and is spaced radially inwardly from the annular peripheral wall 39 of the diffuser plate. This latter cylindrical peripheral wall 39 has a diameter which is spaced radially inwardly a small distance from the inner wall 41 of the housing sleeve 23 so as to define an annular flow clearance therebetween.

The annular recess 34 formed in the underside of the diffuser plate 31 projects axially upwardly only partway through the thickness of the diffuser plate and functions as a small input chamber for waste water. The diffuser plate has a plurality of small cross sectional area discharge openings 36 extending axially therethrough for providing direct communication between the recess 34 and the upper surface 37 of the diffuser plate, which openings 36 are disposed generally uniformly angularly spaced around the diffuser plate generally within a circular pattern. A further plurality of small cross sectional area discharge openings 38 are formed so as to project radially outwardly through the perimeter rim or wall of the diffuser plate, these openings 38 being uniformly circumferentially spaced around the diffuser plate and disposed so that the inner ends thereof communicate directly with the recess 34 whereas the outer ends open radially outwardly through the peripheral surface 39.

The base wall 22 of the housing has an inlet opening 35 formed therein which communicates directly with the annular recess 34, which inlet opening connects to a suitable supply pipe such, as the pipe 14 of FIG. 1, to permit waste water to be supplied into the electrolyzer 15.

Positioned within the interior treating chamber 26 of the electrolyzer is a pair of electrodes, namely an outer electrode 28 and an inner electrode 29. These electrodes are suitably connected to a direct-current power source as explained below to cause electrodes 28 and 29 to function respectively as positive and negative electrode (i.e. the anode and cathode) to create an electric potential between the electrodes and hence cause electrolysis to occur in the waste water contained in the treating chamber 26.

As to the outer electrode 28, this functions as the positive electrode or anode, and is defined by an elongate cylindrical sleevelike member 42 which is disposed within the interior chamber 26 and is substantially concentrically positioned relative to the longitudinally extending axis 27 of the chamber and housing. This cylindrical electrode member 42 has a radially outer surface 43 which is spaced radially inwardly a small distance from the radially inner surface 41 of the housing side wall 23 so as to define an axially-elongate annular clearance or space 59 therebetween. The electrode sleeve 42 has the lower free end 71 thereof disposed adjacent but spaced upwardly a small distance above the upper surface 37 of the diffuser plate 31. In similar fashion the upper end 72 of the electrode sleeve 42 is positioned adjacent but spaced downwardly a small distance from the cover 24 so as to define a small clearance therebetween.

The electrode sleeve 42, adjacent the upper end thereof, has a pair of electrical connectors 44 which are engaged therewith adjacent substantially diametrically opposite sides thereof. These electrical connectors 44 project outwardly through the housing side wall, being supported by suitable insulator ring 45, with both of these electrical connectors 44 being exteriorly connected to an electrical conductor, such as conductor 47 of FIG. 1, so as to apply electrical potential to the sleeve 42 so that it acts as an anode.

The sleeve 42 is constructed of an electrically conductive material, specifically metal. In a preferred embodiment the sleeve is constructed of stainless steel, particularly for use with waste water having a mid-range pH, such as a pH in the range of 7 to 9. While the electrode sleeve 42 can be solid throughout, it can also be provided with perforations or openings located uniformly both axially and circumferentially if desired so as to facilitate flow communication between radially opposite sides thereof.

In an alternate preferred embodiment, the electrode sleeve 42 is constructed of titanium when the waste water is of high or low pH, such as a pH in the range of 4 to 6 or 10 to 12. As an economical way of constructing the titanium electrode 42, such electrode can be constructed from mesh or gridlike titanium which is formed into a sleeve. Iridium-coated titanium mesh is preferred.

Considering now the inner electrode 29, namely the negative electrode or cathode, this is preferably defined by two members, namely outer and inner members 51 and 52, respectively. These cathode members 51 and 52 are each formed by an elongate metal coil spring positioned such that the inner coil spring 52 extends axially of the chamber 26 in generally concentric and surrounding relationship to the longitudinal axis 27, with the outer coil spring 51 being disposed in concentric and surrounding relationship to the inner coil spring 52. The outer coil spring 51 is spaced radially inwardly a substantial distance from the outer electrode sleeve 42 so as to define an axially-elongated annular clearance space or chamber 53 of substantial radial distance therebetween. The outer spring 51, however, is also spaced radially outwardly a small distance from the inner spring 52 so as to define a further axially-elongate annular clearance chamber 54 therebetween, the latter being of rather small radial extent.

The lower free ends of the cathode springs 51 and 52 are engaged with the upper surface of the diffuser plate 31. This plate 31 can be provided with suitable grooves, ribs or other steps if desired so as to properly radially position the lower ends of the springs if desired. For example, in the illustrated embodiment, plate 31 has an upwardly projecting annular rib 73 which projects radially into the annular clearance space between the springs 51 and 52 at the lower ends thereof so as to radially constrain the springs, thus maintaining the springs properly radially positioned with respect to one another and with respect to the housing.

The upper ends of the springs 51 and 52 are maintained in arrangement with an electrical conductor 55 which is mounted on and projects through the top cover 24 generally along the longitudinal central axis 27. The electrical conductor 55 has a conductive support plate 56 which is provided on the inner end thereof and is positioned within the chamber 26 closely adjacent the cover 24. This support plate 56, in the illustrated embodiment, is provided with a truncated conical peripheral surface so as to permit radial concentric support of the upper free ends of the springs 51 and 52, and at the same time provide for controlled axial engagement between the plate 56 and the upper ends of the springs to provide for secure engagement between the springs and the plate 56, such being ensured by causing at least limited axial compression of each of the springs 51 and 52. The conical peripheral surface of plate 56 is preferably nickel plated. This surface is also provided with a plurality of circumferentially spaced flutes or grooves 82 extending axially therealong to permit fluid flow into the interior of the springs when the spring coils build up with metal deposits.

The conductor 55 has a stem part 57 which projects outwardly through the cover 24 and functions as a negative electrical connection terminal for connection to the electrical supply conductor 48 so that the springs 51 and 52 will function as the negative electrode or cathode.

To discharge liquid from the chamber 26, an axially elongate cylindrical discharge tube 61 is positioned interiorly within the inner spring 52 and extends axially throughout a substantial portion of the length of the spring, with the upper end 62 of this tube 61 being positioned in downwardly spaced relationship a small distance from the conductor 56. Outlet guide tube 61 is of a solid wall construction and defines therein an inner cylindrical passage 63 which enables the tube to be guided downwardly over a further guide tube 65 which is threadedly fixed to the diffuser plate 31 and projects upwardly a limited extent so as to effectively act as a concentric guide for the main discharge tube 61. The interior passage 63 of tube 61 communicates with the passage 66 of the guide tube 65, and the passage of the guide tube 65 opens outwardly through a coaxially aligned openings which are formed respectively within the diffuser plate 31 and base wall 22 for defining an outlet opening. This outlet opening in turn communicates with a suitable discharge pipe, such as the discharge pipe 16 of FIG. 1.

The pressure level in the electrolyzer is controlled by a valve 81, such as a ball valve, in the discharge line 16 and which is manually adjustable to maintain an elevated pressure in the chamber 26, such as a pressure of about 15 to 20 psig.

The electrolyzer 15 also has a suitable pressure relief conduit communicating therewith, such being illustrated by a conduit 68 which is mounted on the cover 24 for communication with the interior chamber 26. This pressure relief conduit 68 has a suitable pressure control orifice or throttle 69 associated therewith to allow the electrolyzer to operate under the desired pressure. The relief conduit 68 connects to a suitable collection tank or preferably directly back to the rinse tank to permit safe collection of overflow or gases.

The operation of the electrolyzer 15 will now be briefly described to ensure a complete understanding thereof.

In the assembled condition as illustrated by FIG. 2, the cover 24 is sealed and securely fastened to the housing so as to define the enclosed treating chamber 26 into which waste water containing plating metals is pumped. The pump 13 effects continuous flow of waste water into the chamber 26 through the inlet opening, with the waste water flowing through the electrolyzer so as to permit deposit of heavy metals on the outer cathode coil spring 51, with the cleaned waste water then flowing through the outlet tube 61 for discharge at 16.

With the electrolyzer in the assembled condition as described above, the negative conductor 55 as mounted on the cover 24 engages the upper ends of the cathode springs 51 and 52 and not only concentrically supports the springs in a radial direction, but also effects an axial compression of the springs so that the springs are at least slightly axially compressed between the diffuser plate 31 and the negative conductor 55. This provides intimate contact between the springs and the conductor 55 for transmission of electric current therebetween, and at the same time the lower ends of the springs are supported on the diffuser plate which is of a plastic material and hence functions as an insulator.

In a typical operational condition, the DC potential source 46 is of low voltage, such as about six volts for example, and applies a current of up to about 200 amperes to the electrodes 28 and 29. This effects electrolysis within the waste water which acts as the electrolyte and causes ions to flow toward the respective cathode and anode, with the metals in the waste water acting as positive ions which are attracted to the cathode springs 51 and 52. Upon reaching the outer cathode spring 51, the metals such as copper, nickel, chrome, etc. are deposited on the coils of the outer spring 51, whereas the waste water from which metals have been precipitated is then passed into the discharge tube 61 and flows downwardly along the passage 63 for external discharge.

Throughout the operation, the waste water is pumped into the chamber 26 at a substantially uniform rate and at a substantially uniform but low pressure, such as a maximum pressure in the range of about 15 to 20 psig. A continuous electrolytic operation occurs as the metal-bearing waste water is pumped continuously into the chamber 26, the metals are rather continuously deposited onto the outer .cathode spring 51, and the cleaned waste water then flows out through the discharge tube 61. The waste water can, in a typical arrangement, be supplied at the rate of about 500 to 1,000 gallons per hour.

In addition, the overall arrangement operates at relatively low pressure, namely a pressure of about 15 to 20 psi above atmospheric, which low pressure is highly desirable from an operational standpoint. In addition, any gases which are generated during the electrolysis will migrate to the top of the chamber 26 for escape through the relief conduit 68.

With the improved electrolyzer 15 of this invention, the fact that the waste water is supplied initially into the annular recess 34 of the diffuser plate, from which the waste water is then distributed through a plurality of axially oriented openings or orifices 37 as well as through a plurality of radially oriented openings 38, ensures that the waste water not only initially flow axially upwardly inside the anode sleeve 42, but also requires that the waste water also flow axially upwardly around the outside thereof, thereby ensuring very intimate contact of the incoming waste water over substantially the entirety of the anode sleeve 42. The waste water then tends to migrate inwardly due to the directional flow pattern caused by the fact that the discharge occurs through the center discharge tube 61, the inlet 62 of which is located adjacent the upper end of the chamber, opposite the waste water inlet 35 which is at the lower end of the chamber. The waste water is required to flow radially inwardly toward the discharge tube 61 in order to reach the discharge passage 63, and this is also the direction of movement of the positive metal ions as they migrate radially inwardly toward the negative-charged coil springs 51 and 52. The presence of the spirally wound elongate coil spring 51,52 and their concentric deposition relative to and surrounding the discharge tube 61 ensures a very strong electrolytic action and flow of positive ions toward the cathode, and also provides a large surface area onto which the positive ions (i.e., the metals) can be deposited.

It has been observed that most of the metal ions are deposited on the outer cathode spring 51, and the inner spring 52 remains relatively free of deposits, but nevertheless is effective in increasing the electric field between the cathode and anode so as to provide more effective electrolysis. When the outer spring 51 becomes heavily coated with metal deposits, then the electrolyzer is shut down and the cover removed. The outer spring 51 is removed and replaced either with a clean spring, or in the alternative the removed spring is immediately cleaned so as to dislodged the deposit therefrom, and is then reinstalled back into the electrolyzer 15. Inasmuch as the deposits on the spring 51 are normally very hard and brittle, removal of the deposits can be normally effected by subjecting the coated spring to various impact forces. Further, when the unit 15 is disassembled, the compression forces on the spring are relieved so that the natural elasticity of the spring is believed to assist in breaking off the deposits.

As to the construction of the cathode springs 51 and 52, which springs are typically of carbon steel, the cylindrical rod stock defining the coils of the outer spring 51 preferably has a diameter which is significantly greater than the diameter of the rod stock defining the coils of the inner spring 52, this in a preferred embodiment being about a 2:1 diameter ratio. This results in the coils of the outer spring 51 having a significantly larger surface area than the coils of the inner spring 52, such surface areas being in the ratio of 4:1 when the springs are formed from rod stock having the aforementioned 2:1 diameter ratio. The significantly larger surface area defined by the coils of the outer cathode spring 51, coupled with the significantly increased area of the coils of the spring 51, is believed to result in this outer spring having a higher electrical charge than the inner spring 52, and hence results in the outer spring being highly effective for receiving metal deposits thereon.

In addition, the springs 51 and 52 are preferably provided with a large number of coils, that is, the coils are preferably closely axially positioned when in the compressed state within the treating chamber so as to further maximize the surface area on which metal ions can be deposited. Under normal operating conditions, the axial clearance between adjacent coils, particularly between the adjacent coils of the outer spring 51 when installed in the electrolyzer 15, will be at least somewhat less than the diameter of the rod material defining the coils. The small axial clearance spaces between adjacent coils not only increases the coil surface area as discussed above, but also provides more control over the flow of the waste water and particularly ensures that the waste water flows more closely and more intimately relative to and between the coils as the waste water flows radially inwardly so as to ultimately reach the discharge tube 61.

During operation of the electrolyzer, the overall performance achievable during the electrolysis also is such that if the electrolyte or waste water is a cyanide solution, then the negative cyanide ions are attracted to the anode 28, at which location the cyanide ions oxidize into cyanate in accordance with a known chemical reaction so as to further assist in removing undesired constituents from the waste water.

Figure 4:
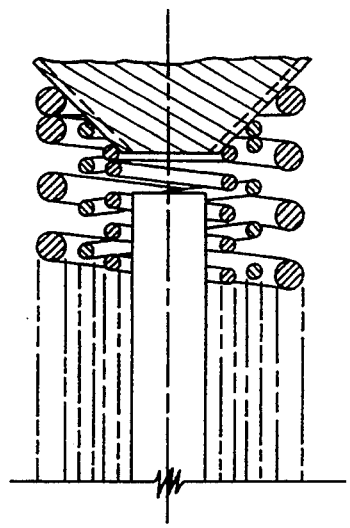
FIG. 4 is a fragmentary view of a variation.
Figure 3:
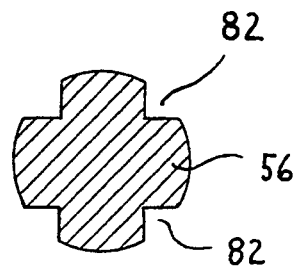
FIG. 3 is a cross-sectional view of the support plate for the cathode springs.

The cathode of the electrolyzer may be defined by more than two coil springs, and FIG. 4 shows a variation wherein the cathode is defined by three spaced but concentric coil springs positioned one within another.

To increase the quantity and/or heating rate of the waste water, two or more electrolyzers 15 can be connected in series so that the waste water sequentially flows through and is sequentially treated by each electrolyzer.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an electrolyzing apparatus for depositing metals from plating waste water, said apparatus including a housing defining therein an electrolytic treating chamber for treating plating waste water, comprising the improvement wherein:

said housing includes an upright cylindrical tubular side wall joined between upper and lower end walls and defining said treating chamber therein;

a diffuser plate positioned within said treating chamber at the bottom thereof, said-diffuser plate defining therein a subchamber which is isolated from said treating chamber;

inlet means communicating directly with said subchamber for supplying plating waste water thereto;

said diffuser plate having a plurality of spaced discharge openings of small cross section formed therein for permitting flow of plating waste water from said subchamber into said treating chamber;

a first substantially tubular and elongate electrode positioned generally concentrically within said treating chamber and extending axially throughout a majority of the length thereof, said first electrode being disposed radially inwardly at least a small distance from the upright side wall of said housing, said first electrode functioning as an anode, and at least a first electrical conductor engaged with said anode and projecting outwardly through said housing for connection to one side of a direct-current power source;

a second elongated electrode positioned generally concentrically within said treating chamber in radially inwardly spaced relationship from said first electrode and extending throughout substantially the entirety of the length of said treating chamber, said second electrode functioning as a cathode to permit deposit of metals thereon, and a second electrical conductor joined to said second electrode and mounted on and projecting outwardly of said housing for connection to the other side of the direct-current power source;

said second electrode comprising an elongate coil spring of electrically-conductive metal, said coil spring extending concentrically along the treating chamber substantially between the upper end wall and the diffuser plate and being maintained in a resiliently compressed condition but with individual adjacent coils of the spring being axially spaced apart to permit waste water flow therebetween; and discharge conduit means projecting into said treating chamber generally concentrically within said coil spring, said discharge conduit means defining therein a discharge passage which terminates in an inlet opening which is spaced upwardly a substantial distance above said diffuser plate, said discharge conduit means and the passage defined therein projecting outwardly of said housing for external discharge of waste water from which metals have been removed.

2. An apparatus according to claim 1, wherein said second electrode includes a second elongate coil spring of electrically conductive metal which is concentrically positioned in surrounding relationship to said discharge conduit means and which is also concentrically positioned in radially inwardly spaced relationship from said first-mentioned coil spring, said second coil spring also being engaged with said second conductor so as to function as a cathode.

3. An apparatus according to claim 2, wherein each of said first-mentioned and second coil springs are maintained in a resiliently axially compressed condition by being engaged at upper ends thereof which said second conductor and by being engaged at lower ends thereof with said diffuser plate.

4. An apparatus according to claim 3, wherein said first-mentioned coil spring is formed from rod stock having a diameter which is significantly greater than the diameter of the rod stock used for forming the second coil spring.

5. An apparatus according to claim 2, wherein the plurality of discharge openings formed in said diffuser plate are disposed within a generally circular pattern which concentrically surrounds the first-mentioned coil spring and is positioned radially between said first-mentioned coil spring and said first electrode for direct communication with an annular open region defined therebetween, said discharge openings projecting axially upwardly through the diffuser plate from said subchamber for direct communication with said treating chamber.

6. An apparatus according to claim 5, wherein said diffuser plate has an outer peripheral wall which corresponds approximately to the outer wall diameter of said first electrode, said outer peripheral wall of said diffuser plate being surrounded by an open annular region of said treating chamber which is in open communication with the annular region of said treating chamber defined between said first electrode and the tubular side wall of said housing, and a second plurality of circumferentially-spaced discharge openings of small cross section formed in said diffuser plate for communication with said subchamber, said latter-mentioned discharge openings projecting radially outwardly from said subchamber for discharge through the outer peripheral wall of said diffuser plate.

7. An apparatus according to claim 6, wherein the first electrode has a lower free end which is positioned adjacent but spaced upwardly by a small clearance distance from the upper surface of the diffuser plate.

8. An apparatus according to claim 2, wherein the second conductor is coaxially mounted on and projects downwardly from the upper wall of said housing, said second conductor having a cylindrical support plate which directly engages and concentrically centers the first-mentioned and second coil springs relative to one another.

9. An apparatus according to claim 8, wherein said upper end wall of said housing defines a removable cover.

10. An apparatus according to claim 1, including pump means for supplying pressurized waste water into said treating chamber and for maintaining the waste water within the treating chamber at a pressurized level above atmospheric pressure throughout the treating process.

11. An apparatus according to claim 1, wherein the plurality of discharge openings formed in said diffuser plate are disposed within a generally circular pattern which concentrically surrounds the coil spring and is positioned radially between said coil spring and said first electrode for direct communication with an annular open region defined therebetween, said discharge openings projecting axially upwardly through the diffuser plate from said subchamber for direct communication with said treating chamber.

12. An apparatus according to claim 11, wherein said diffuser plate has an outer peripheral wall which corresponds approximately to the outer wall diameter of said first electrode, said outer peripheral wall of said diffuser plate being surrounded by an open annular region of said treating chamber which is in open communication with the annular region of said treating chamber defined between said first electrode and the tubular side wall of said housing, and a second plurality of circumferentially-spaced discharge openings of small cross section formed in said diffuser plate for communication with said subchamber, said latter-mentioned discharge openings projecting radially outwardly from said subchamber for discharge through the outer peripheral wall of said diffuser plate.

13. An apparatus according to claim 1, wherein the second conductor is coaxially mounted on and projects downwardly from the upper wall of said housing, said second conductor having a cylindrical support plate which directly engages and concentrically centers the coil spring relative to the housing.

14. An apparatus according to claim 13, wherein said upper end wall of said housing defines a removable cover.

15. An apparatus according to claim 14, wherein the discharge conduit means projects coaxially downwardly of the housing and opens through the lower end wall generally along the longitudinal axis of the housing.

16. In an electrolyzing apparatus for depositing metals from plating waste water, said apparatus including a housing defining therein an electrolytic treating chamber for treating plating waste water, comprising the improvement wherein:

said housing includes an elongate cylindrical tubular side wall joined between first and second end walls and defining said treating chamber therein;

diffuser means mounted on and positioned within said treating chamber adjacent said first end wall for supplying plating waste water into the treating chamber adjacent one end thereof, said diffuser means including a plurality of small discharge ports which are disposed in angularly spaced relationship relative to the cross section of said treating chamber for supplying plating waste water into said treating chamber in a more uniform cross sectional pattern;

said second end wall comprising a removable cover so as to facilitate access into said treating chamber;

inlet means formed in said housing and communicating with said diffuser means for supplying plating waste water thereto;

a first generally cylindrical sleevelike and elongate electrode positioned generally concentrically within said treating chamber and extending axially throughout a majority of the length thereof, said first electrode being disposed radially inwardly at least a small distance from the cylindrical side wall of said housing, said first electrode functioning as an anode, and at least a first electrical conductor engaged with said anode and projecting outwardly through said housing for connection to one side of a direct current power source;

a second elongated electrode position generally concentrically within said treating chamber in radially inwardly spaced relationship from said first electrode and extending throughout substantially the entirety of the length of said treating chamber, said second electrode functioning as a cathode to permit deposit of metals thereon, and a second electrical conductor joined to said second electrode and mounted on and projecting outwardly of said housing for connection to the other side of the direct-current power source;

said second electrode comprising a first elongate coil spring of electrically conductive metal positioned within and extending coaxially along the treating chamber between the first and second end walls and maintained in a resiliently compressed condition but with individual adjacent coils of the spring being axially spaced apart to permit waste water flow therebetween, said first coil spring being disposed concentrically relative to the first electrode in radially inwardly spaced relationship therefrom;

said second electrode comprising a second elongate coil spring of electrically conductive material disposed concentrically and in radially spaced relationship within said first coil spring, said second coil spring also extending concentrically along the treating chamber substantially between the first and second end walls and being maintained in a resiliently compressed condition but with individual adjacent coils of the spring being axially spaced apart to permit waste water flow therebetween; and discharge conduit means projecting into the treating chamber generally concentrically within said second coil spring, said discharge conduit means defining therein a discharge passage which terminates in an inlet opening which is positioned more closely adjacent said cover, said discharge conduit means and the passage defined therein projecting outwardly of the housing for external discharge of waste water from which metals have been removed.

17. An apparatus according to claim 16, wherein said diffuser means includes a diffuser member constructed of a plastics material and positioned adjacent and in supportive engagement with said first end wall, said first and second coil springs having one end thereof maintained in engagement with said diffuser member, said second conductor being mounted on and projecting inwardly of said cover, said second conductor having a conductive cylindrical supporting member which is maintained in compressive and concentric centering engagement with the other ends of said first and second coil springs.

18. An apparatus according to claim 17, wherein said discharge conduit means includes a hollow discharge pipe which projects coaxially inwardly through said first wall into said treating chamber concentrically within and radially spaced from said second coil spring, said discharge conduit terminating at a free end which defines said inlet opening, said free end being positioned in close proximity to but spaced axially from said second conductor.

* * * * *

UNITED STATES PATENT AND TRADEMARK OFFICE
CERTIFICATE OF CORRECTION

PATENT NO. : 5 401 374
DATED : March 28, 1995
INVENTOR(S) : René LEUTWYLER

It is certified that error appears in the above-indentified patent and that said Letters Patent is hereby corrected as shown below:

Column 8, line 26; change "said-diffuser" to ---said diffuser---.

Column 9, line 20; change "which" to ---with---.

Signed and Sealed this

Twenty-second Day of August, 1995

Attest:

BRUCE LEHMAN

Attesting Officer    Commissioner of Patents and Trademarks